(12) United States Patent
Moore, Jr.

(10) Patent No.: US 9,301,440 B1
(45) Date of Patent: Apr. 5, 2016

(54) COMPOSITIONS AND METHODS OF TREATING ANIMAL MANURE

(71) Applicant: The United States of America, as represented by the Secretary of Agriculture, Washington, DC (US)

(72) Inventor: Philip A. Moore, Jr., Fayetteville, AR (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 0 days.

(21) Appl. No.: 14/331,869

(22) Filed: Jul. 15, 2014

(51) Int. Cl.
*C05F 3/00* (2006.01)
*A01K 29/00* (2006.01)
*A01C 3/00* (2006.01)

(52) U.S. Cl.
CPC ... *A01C 3/00* (2013.01); *C05F 3/00* (2013.01); *A01K 29/00* (2013.01)

(58) Field of Classification Search
None
See application file for complete search history.

(56) References Cited

U.S. PATENT DOCUMENTS

| | | | | |
|---|---|---|---|---|
| 5,401,487 | A * | 3/1995 | Puerto et al. | 423/712 |
| 5,865,143 | A * | 2/1999 | Moore, Jr. | 119/442 |
| 5,928,403 | A * | 7/1999 | Moore, Jr. | 71/21 |
| 5,942,199 | A * | 8/1999 | Jokinen et al. | 423/122 |
| 5,961,968 | A * | 10/1999 | Moore, Jr. | 424/76.6 |
| 6,221,233 | B1 * | 4/2001 | Rendall | 205/372 |
| 7,011,824 | B2 * | 3/2006 | Moore, Jr. | 424/76.8 |
| 8,679,427 | B2 * | 3/2014 | Ishikawa | 423/121 |
| 2001/0051121 | A1 * | 12/2001 | Barnett et al. | 423/127 |
| 2005/0087107 | A1 * | 4/2005 | Jaquays | 106/638 |
| 2006/0230798 | A1 * | 10/2006 | McConchie et al. | 71/33 |
| 2006/0254331 | A1 * | 11/2006 | Burnham | 71/11 |
| 2009/0193863 | A1 * | 8/2009 | Szogi et al. | 71/21 |
| 2010/0129279 | A1 * | 5/2010 | Lloyd | 423/85 |
| 2013/0125599 | A1 * | 5/2013 | Kpomblekou-Ademawou | 71/21 |
| 2013/0255339 | A1 * | 10/2013 | Zaharoff et al. | 71/21 |

FOREIGN PATENT DOCUMENTS

| | | | |
|---|---|---|---|
| CN | 102285843 | * | 12/2011 |
| CN | 102795922 | * | 11/2012 |
| HU | 208102 | * | 8/1993 |

OTHER PUBLICATIONS

Amit Adak et al, "Alum Mud: Phase Identification and Catalytic Potential for Aqueous-Phase Decomposition of Hydrogen Peroxide", Clays and Clay Minerals, vol. 47, No. 2, 234-238, 1999.*

* cited by examiner

*Primary Examiner* — Wayne Langel
(74) *Attorney, Agent, or Firm* — John D. Fado; G. Byron Stover

(57) ABSTRACT

Disclosed are manure amendment compositions containing a dry or liquid mixture of (1) alum mud and at least one member selected from the group consisting of acid (e.g., sulfuric), bauxite, and mixtures thereof, or (2) bauxite and at least one member selected from the group consisting of acid (e.g., sulfuric), alum mud, and mixtures thereof, which when added to animal manure will form a treated manure product having improved environmental, health and/or animal performance. Also disclosed are various methods of using the manure amendment composition.

63 Claims, 2 Drawing Sheets

COMPOSITIONS AND METHODS OF TREATING ANIMAL MANURE

BACKGROUND OF THE INVENTION

Disclosed are manure amendment compositions containing a dry or liquid mixture of (1) alum mud and at least one member selected from the group consisting of acid (e.g., sulfuric), bauxite, and mixtures thereof, or (2) bauxite and at least one member selected from the group consisting of acid (e.g., sulfuric), alum mud, and mixtures thereof, which when added to animal manure will form a treated manure product having improved environmental, health and/or animal performance. Methods of treating animal manure, said methods involving contacting said animal manure with an effective treatment amount of the above manure amendment composition or alum mud to form a treated waste product having an improved environmental, health and/or animal performance property. Methods for inhibiting ammonia volatilization from animal manure, said methods involving applying the above manure amendment composition or alum mud to animal manure in an amount sufficient to reduce the pH of said animal manure and thereby reduce ammonia volatilization from said poultry litter or animal manure for at least 24 hours compared to untreated animal manure. Methods for controlling atmospheric ammonia levels in an animal rearing facility, said methods involving applying the above manure amendment composition or alum mud to a portion of a manure receiving surface (e.g., floor such as a dirt floor) in said animal rearing facility in an amount sufficient to reduce the pH of said portion and thereby inhibit ammonia volatilization from said manure receiving surface for at least 24 hours to control atmospheric ammonia levels in said animal rearing facility at or below a selected level, said manure receiving surface comprising previously deposited manure. Methods for reducing the amount of phosphorus runoff and/or phosphorus leaching from fields fertilized with animal manure, said methods involving treating animal manure to be used as agriculture fertilizer by admixing said animal manure with the above manure amendment composition or alum mud at a rate sufficient to reduce the water extractable phosphorus in said animal manure and thereafter applying said poultry litter or animal manure to fields (e.g., soil) as an agricultural fertilizer. Methods for reducing the amount of metals runoff and/or leaching from fields fertilized with animal manure, said methods involving treating animal manure to be used as agriculture fertilizer by admixing said animal manure with the above manure amendment composition or alum mud at a rate sufficient to reduce the water extractable metal content in said animal manure; and thereafter applying said animal manure to fields (e.g., soil) as an agricultural fertilizer.

Two of the biggest problems associated with animal manure are phosphorus (P) runoff and ammonia ($NH_3$) emissions. Phosphorus runoff and leaching can result in accelerated eutrophication of lakes and rivers since P is normally the limited nutrient for algal production in freshwater systems (Schlinder, D. W., Science, 195: 260-262 (1977)). Phosphorus concentrations in runoff from fields fertilized with poultry litter can be very high, even when litter is applied at low to moderate levels (Edwards, D. R., and T. C. Daniel, Trans. Am. Soc. Agric. Eng., 35:1827-1832 (1992); Edwards, D. R., and T. C. Daniel, Bioresour. Technol., 41:9-33. (1992)). Edwards and Daniel (Edwards, D. R., and T. C. Daniel, J. Environ. Qual., 22:361-365 (1993)) reported that 80-90% of the P in runoff from pastures fertilized with poultry litter is soluble reactive P (SRP), which is the form that is most readily available for algal uptake (Sonzogni, W. C., et al., J. Environ. Qual., 11:555-563 (1982)). Several researchers have shown that P runoff and leaching from manure is more closely correlated to the amount of soluble P in the manure than total P (Shreve, B. R., et al., J. Environ. Qual., 24:106-111 (1995); Smith, D. R., et al., J. Environ. Qual., 30:992-998 (2001a); DeLaune, P. B., et al., J. Environ. Qual., 33:728-734 (2004a); DeLaune, P. B., et al., J. Environ. Qual., 33:2192-2200 (2004b)). Runoff water from fields fertilized with poultry litter has also been shown to have high concentrations of metals, such as arsenic, copper and zinc, which may cause water quality problems (Moore, P. A., Jr., T. C. Daniel, J. T. Gilmour, B. R. Shreve, D. R. Edwards, and B. H. Wood, J. Environ. Qual., 27:92-99 (1998).

Ammonia concentrations often exceed 25 ppm in poultry houses, which can reduce poultry performance (Reece, F. N., et al., Poult. Sci., 59:486-488 (1980); Carlile, F. S., World's Poult. Sci. J., 40(2):99-113 (1984); Miles, D. M., et al., Poult. Sci., 83:1650-1654 (2004); Moore, P. A., Jr., et al., J. Environ. Qual., 40:1395-1404 (2011)). High levels of $NH_3$ damage the respiratory tract of chickens, which negatively affected their immune system, making them more susceptible to diseases (Anderson, D. P., et al., Avian Dis., 8:369-379 (1964)). This may be more important than in the past due to the current threat posed by avian influenza. The incidence of airsaculitis has been shown to increase dramatically when broilers are exposed to high $NH_3$ concentrations. Negative impacts on feed conversion and weight gains, along with ocular damage, have been shown to occur when $NH_3$ concentrations in poultry barns are high. These negative impacts of $NH_3$ have generally been reported when in-house concentrations exceed 25 ppm (uL $L^{-1}$), hence it is recommended that $NH_3$ concentrations be kept below this critical level in poultry barns (Carlile 1984). However, it was found that the average $NH_3$ concentration in four poultry houses in NW Arkansas that were continually monitored for one year was 25.1 uL $L^{-1}$ with much higher levels during winter months, and that over half of the N excreted from the birds at this farm was lost to the atmosphere as $NH_3$ before the litter was removed from the barns (Moore et al. 2011). This not only represent a huge waste of a natural resource (300 million Kg N/year in the U.S. alone), but it results in air and water pollution. Approximately 80% of atmospheric $NH_3$ loading in the United States comes from agriculture sources, with poultry responsible for 25% of the total (Batty, R., et al., Developments and selection of ammonia emissions factors: Final report, EC/R Inc., Durham, N.C., EPA Contract Report#68-D3-0034, U.S. Environmental Protection Agency, Research Triangle Park, NC, pp 111 (1994)).

In the 1990s Moore discovered that a simple topical application of alum to poultry litter would reduce P runoff and $NH_3$ volatilization (U.S. Pat. Nos. 5,622,697; 5,914,104; 5,928, 403; 5,961,968; 5,865,143; 5,890,454). It was also discovered that $AlCl_3$ could be used for reducing $NH_3$ emissions and P runoff from swine manure (U.S. Pat. Nos. 6,346,240 and 7,011,824). The chloride salt of Al is preferable for liquid manures because sulfate can be reduced to hydrogen sulfide under anaerobic conditions which may aggravate odor issues.

During the past 20 years several studies have shown how alum additions reduce $NH_3$ emissions and P runoff from manure (Moore, P. A., Jr., et al., J. Environ. Qual., 24:294-300 (1995); Moore, P. A., Jr., et al., Poult. Sci., 75:315-320 (1996); Moore, P. A., Jr., et al., Poult. Sci., 78:692-698 (1999); Moore, P. A., Jr., et al., J. Environ. Qual., 29:37-49 (2000); Moore, P. A., Jr., and D. R. Edwards, J. Environ. Qual., 36:163-174 (2007); Smith, D. R., et al., J. Environ. Qual., 30:992-998 (2001a); Smith, D. R., et al., J. Anim. Sci., 82:605-611 (2001b)). Additions of alum to poultry litter have also been shown to reduce arsenic, copper and zinc runoff from fields fertilized with litter (Moore, P. A., Jr., et al., J. Environ. Qual., 27: 92-99 (1998)). Moore and Miller (Moore, P. A., Jr., and D. M. Miller, J. Environ. Qual., 23:325-330 (1994)) published the first report that showed chemical amendments, such as alum, could be added to poultry litter to reduce P solubility. Later work by Moore et al. (1995, 1996, 1999, 2000) showed alum additions to poultry litter resulted in improved poultry production and higher crop yields, in addition to environmental benefits such as reduced $NH_3$ emissions and reducing concentrations of P, metals and estrogen in runoff water and reducing P leaching. Alum was also shown to greatly reduce energy costs (e.g., propane) due to reduced ventilation requirements in cooler months as a result of lower in-house $NH_3$ (Moore et al., 1999, 2000). Treating poultry litter with alum significantly reduces pathogens (e.g., *Salmonella* and *Campylobacter*) both in the litter and on poultry carcasses (Line, J. E., Poult. Sci., 81:1473-1477 (2002)). A cost/benefit analysis showed that the production benefits due to alum made this BMP (best management practice) very cost effective (Moore et al., 2000).

Due to the production and environmental benefits of this BMP, over one billion broiler chickens are currently grown each year in the U.S. with alum (Moore, 2011). However, this only represents about 10% of the industry. The main reason cited by poultry growers and industry personnel for not using alum is cost, which has increased dramatically during the past 20 years.

Thus, a need exists to develop a manure amendment that is as effective as alum, for example in reducing $NH_3$ volatilization and P runoff, yet costs much less.

SUMMARY OF THE INVENTION

Disclosed are manure amendment compositions containing a dry or liquid mixture of (1) alum mud and at least one member selected from the group consisting of acid (e.g., sulfuric), bauxite, and mixtures thereof, or (2) bauxite and at least one member selected from the group consisting of acid (e.g., sulfuric), alum mud, and mixtures thereof, which when added to animal manure will form a treated manure product having improved environmental, health and/or animal performance. Methods of treating animal manure, said methods involving contacting said animal manure with an effective treatment amount of the above manure amendment composition or alum mud to form a treated waste product having an improved environmental, health and/or animal performance property. Methods for inhibiting ammonia volatilization from animal manure, said methods involving applying the above manure amendment composition or alum mud to animal manure in an amount sufficient to reduce the pH of said animal manure and thereby reduce ammonia volatilization from said poultry litter or animal manure for at least 24 hours compared to untreated animal manure. Methods for controlling atmospheric ammonia levels in an animal rearing facility, said methods involving applying the above manure amendment composition or alum mud to a portion of a manure receiving surface (e.g., floor such as a dirt floor) in said animal rearing facility in an amount sufficient to reduce the pH of said portion and thereby inhibit ammonia volatilization from said manure receiving surface for at least 24 hours to control atmospheric ammonia levels in said animal rearing facility at or below a selected level, said manure receiving surface comprising previously deposited manure. Methods for reducing the amount of phosphorus runoff and/or phosphorus leaching from fields fertilized with animal manure, said methods involving treating animal manure to be used as agriculture fertilizer by admixing said animal manure with the above manure amendment composition or alum mud at a rate sufficient to reduce the water extractable phosphorus in said animal manure and thereafter applying said poultry litter or animal manure to fields (e.g., soil) as an agricultural fertilizer. Methods for reducing the amount of metals runoff and/or leaching from fields fertilized with animal manure, said methods involving treating animal manure to be used as agriculture fertilizer by admixing said animal manure with the above manure amendment composition or alum mud at a rate sufficient to reduce the water extractable metal content in said animal manure; and thereafter applying said animal manure to fields (e.g., soil) as an agricultural fertilizer.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION OF THE INVENTION

Figure 1:
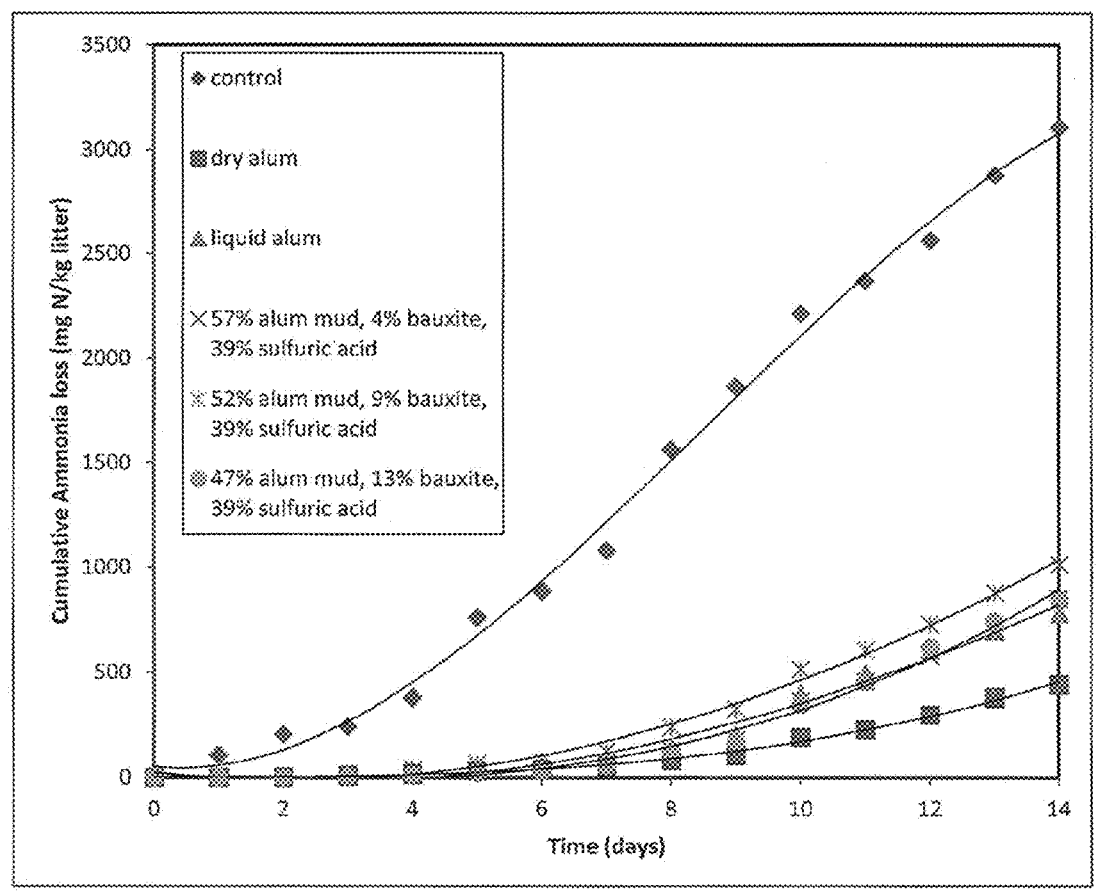
FIG. 1 shows cumulative $NH_3$ volatilization from untreated poultry litter and litter treated with dry alum, liquid alum, and mixtures 1, 2, and 3.

Disclosed are manure amendment compositions containing a dry or liquid mixture of (1) alum mud and at least one member selected from the group consisting of acid (e.g., sulfuric), bauxite, and mixtures thereof, or (2) bauxite and at least one member selected from the group consisting of acid (e.g., sulfuric), alum mud, and mixtures thereof, which when added to animal manure will form a treated manure product having improved environmental, health and/or animal performance. Methods of treating animal manure, said methods involving contacting said animal manure with an effective treatment amount of the above manure amendment composition or alum mud to form a treated waste product having an improved environmental, health and/or animal performance property. Methods for inhibiting ammonia volatilization from animal manure, said methods involving applying the above manure amendment composition or alum mud to animal manure in an amount sufficient to reduce the pH of said animal manure and thereby reduce ammonia volatilization from said poultry litter or animal manure for at least 24 hours compared to untreated animal manure. Methods for controlling atmospheric ammonia levels in an animal rearing facility, said methods involving applying the above manure amendment composition or alum mud to a portion of a manure receiving surface (e.g., floor such as a dirt floor) in said animal rearing facility in an amount sufficient to reduce the pH of said portion and thereby inhibit ammonia volatilization from said manure receiving surface for at least 24 hours to control atmospheric ammonia levels in said animal rearing facility at or below a selected level, said manure receiving surface comprising previously deposited manure. Methods for reducing the amount of phosphorus runoff and/or phosphorus leaching from fields fertilized with animal manure, said methods involving treating animal manure to be used as agriculture fertilizer by admixing said animal manure with the above manure amendment composition or alum mud at a rate sufficient to reduce the water extractable phosphorus in said animal manure and thereafter applying said poultry litter or animal manure to fields (e.g., soil) as an agricultural fertilizer. Methods for reducing the amount of metals runoff and/or leaching from fields fertilized with animal manure, said methods involving treating animal manure to be used as agriculture fertilizer by admixing said animal manure with the above manure amendment composition or alum mud at a rate sufficient to reduce the water extractable metal content in said animal manure; and thereafter applying said animal manure to fields (e.g., soil) as an agricultural fertilizer.

A waste product from the alum (aluminum sulfate) manufacturing process, commonly referred to as alum mud, can be reacted with acid, optionally bauxite, and optionally water to make an inexpensive manure amendment with properties similar to alum. Since alum mud and bauxite vary in composition tremendously, the amount of acid (e.g., sulfuric), alum mud, bauxite, and water could be varied markedly, depending on the moisture, pH, and aluminum content of the alum mud and the aluminum content of the bauxite. Likewise, the exact formulation of the final product could be tailored to fit specific manure types, depending on their acid neutralizing capacity, moisture content, pH, and upon the distance the product will be shipped. Hence, this product could be made using a multitude of compositions in which the amounts of all of the ingredients listed above would be varied. For example, if a particular source of alum mud had an extremely high aluminum content with a high soluble aluminum content, then bauxite may not need to be added. Or if a particular source of alum mud was very moist, then water may not be needed. Or if the distance to be shipped was greater than normal, then a more concentrated form of the product could be prepared that contained more bauxite and sulfuric acid and less alum mud and water.

The compositions and methods described herein may be understood more readily by reference to the following detailed description of the invention and the examples included therein and to the figures and their previous and following description. Before the present compounds, compositions and methods are disclosed and described, it is to be understood that the present compounds, compositions and methods are not limited to specific methods, or to particular formulations, as such may, of course, vary. It is also to be understood that the terminology used herein is for the purpose of describing particular embodiments only and, unless the context dictates otherwise, is not intended to be limiting.

In this specification and in the claims which follow, reference will be made to a number of terms which shall be defined to have the following meanings:

Parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

"Optional" or "optionally" means that the subsequently described event or circumstance may or may not occur, and that the description includes instances in which said event or circumstance occurs and instances where it does not. For example, the phrase "optionally comprising bauxite ore" means that the composition may or may not contain bauxite ore and that this description includes compositions that contain and do not contain bauxite ore.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Animal manure refers to animal excrement (solid waste, dung) and urine, optionally with animal bedding, spilled food, spilled water, and/or feathers. This includes manure from, for example, chickens, turkeys, ducks, geese, swine, sheep, goats, cattle, dairy cows, horses, or rabbits. The animal manure may be solid or liquid or a slurry.

Animal manure solids refer to manure solids that are present in a composition, such as poultry litter or an animal waste slurry, that contains manure. Solids content refers to the amount of solids present in a composition that remain after water from the liquid is evaporated. There are cases where animal manure solids exist that are not mixed with anything, such as in cattle feed lots.

Poultry litter is a mixture of manure, bedding material (such as sawdust, wood shavings, straw, recycled paper, nut hulls, or rice hulls), spilled food and feathers. Poultry litter is the bed of material on which poultry, such as broiler chickens, are raised in commercial poultry rearing facilities. Because the same bed of litter is often used in successive growouts or flocks of poultry, the litter varies over time with the addition of manure to the litter, the addition of bedding or amendments between growouts, and efforts to clean or de-cake the litter between growouts. "De-caking" refers to the process whereby a mechanical device is used to sift the poultry litter between growouts to remove the larger particles, which typically have a higher moisture content than the rest of the litter.

A manure slurry refers to a mixture of manure and a liquid, e.g., urine and/or water. Thus, a manure slurry is formed when animal manure and urine are contacted, or when manure is mixed with water from an external source.

A controlled animal rearing facility refers to any facility in which animals are gathered, and in which livestock manure is collected and managed.

Disclosed herein are methods of treating animal manure solids comprising contacting the solids with a manure treatment composition containing a dry or liquid mixture of alum mud, optionally bauxite, an acid (e.g., sulfuric acid) and optionally water. It is understood that treatment composition does not necessarily require water, especially since water will seldom be needed unless alum is being added. It is also understood that any acid (proton donor, e.g., hydrochloric acid, phosphoric acid, nitric acid, perchloric acid, mixtures of acids) can be used instead of sulfuric acid.

Disclosed are new inexpensive methods for treating animal manure, such as poultry litter, which inhibit ammonia volatilization from the manure and reduce soluble phosphorus levels in the manure and phosphorus runoff from fields fertilized with manure. The method involves the addition of the manure treatment composition to animal manure. Since animal manure is highly variable in composition, the quantity of the manure treatment composition needed to reduce ammonia volatilization also varies. However, the amount of the manure treatment composition necessary to inhibit the buildup of atmospheric ammonia in poultry rearing facilities is the amount sufficient to maintain the litter pH at values low enough to inhibit ammonia volatilization. In this regard, the manure treatment composition is applied to the litter in an amount equivalent to approximately 0.001-50% of the litter weight on a dry weight basis. For example, if a 4% rate were used, then 40 grams of the manure treatment composition could be applied per kilogram of litter. During a normal growout, 20,000 chickens will generate 20 tons of moist poultry litter (16 tons dry). Therefore, 0.8 tons (1600 lbs) of the manure treatment composition would be required per poultry house after each growout if the 4% rate were used.

Many poultry producers only use one-third or one-half of the house to rear chickens or turkeys when they are young. This is usually referred to as the "brooding chamber" or "brood end of the house". When this management practice is being employed, the producer only heats and/or cools that portion of the rearing facility where the animals are. In this scenario, it may be more cost effective for the producer to apply the treatment composition only to the brood portion of the house since the atmosphere from the other side of the house is not being mixed with this atmosphere. This can effectively reduce the amount of treatment composition needed by 50% to 66% (if only one-half to one-third of the house is being used).

Preferably, the manure treatment composition should be applied to the top of the manure or poultry litter and thoroughly mixed in with a mechanical mixer, such as a litter decaking machine. However, the treatment can be applied to the surface of the manure without mixing. Treatment composition applications to manure, such as poultry litter, also greatly reduced nitrogen loss in the litter, thereby further enhancing the value of this treated poultry litter as a fertilizer source.

The "dry" treatment composition may be broadcast applied onto animal manure or poultry litter in an animal rearing facility by several different methods, including, but not limited to, the following: (1) by hand, (2) using a fertilizer spreader, (3) using a lime spreader, (4) using a manure spreader, (5) using a poultry litter decaker, (6) using a litter or manure truck, and/or (7) using a system of stationary or moving spreading devices that are permanently attached to the house. The "liquid" treatment composition may be applied onto animal manure or poultry litter in an animal rearing facility by several different methods, including, but not limited to, the following: (1) a backpack sprayer, (2) a boom sprayer pulled behind a truck or tractor, and/or (3) a system of stationary or moving spraying devices permanently attached to the house.

The manure treatment compositions are employed in amounts effective to provide a treated waste (manure) product having at least one improved environmental, health and/or animal performance property as compared to a waste (manure) product that is not treated with the treatment composition.

For example, the methods can be effective in reducing phosphorus solubility in the manure, reducing phosphorus runoff and/or phosphorus leaching from fields fertilized with manure, inhibiting ammonia volatilization from the manure, flocculating at least a portion of the solids in the manure, reducing at least one pathogen in the manure, increasing the nitrogen content in the manure, reducing acid rain, atmospheric nitrogen loading, and PM-10s (particulate matter <10 microns), associated with the manure, reducing energy use in an animal rearing facility (by reducing ventilation requirements), and improving animal performance (such as weight gain, feed conversion, and/or disease resistance of animals).

When the manure treatment composition is contacted with manure or poultry litter to form a treated waste product, it can lower the pH of the manure, and converts ammonia to ammonium, which keeps the inorganic nitrogen from volatilizing. Thus, this process increases the fertilizer value of the manure while inhibiting ammonia volatilization inside the animal rearing facility and to the atmosphere, for the benefit of both animals and humans alike.

The methods are effective for treating any livestock manure, and especially poultry litter and livestock manures that are combined in liquid slurries in controlled livestock rearing operations. Animals commonly reared in such operations include sheep, swine, poultry, goats, cattle, dairy cows, ducks, turkeys, and geese. The methods are especially applicable to poultry rearing, swine rearing, and dairy cow rearing operations.

The amount of the manure treatment composition that is contacted with the animal manure solids generally depends upon the amount of solids in need of treatment. In slurry operations, the solids are from two sources in slurry operations: (1) fresh manure from the livestock, and (2) if water is recycled from the holding pond, the amount of manure solids present in the recycled water. The amount of the treatment composition used may also depend on the phosphorus content and/or the alkalinity of the animal waste, both of which are normally related to the solids contents.

In a preferred embodiment, which can be particularly effective for reducing phosphorus solubility and inhibiting ammonia volatilization, the resulting waste product comprises from about 0.001 to about 50 parts by weight of the manure amendment and about 99.999 to about 50 parts by weight animal manure. These components of the waste product can generally be present at any ratio or range of ratios within the above endpoints.

The amount of the manure treatment composition that is effective to inhibit ammonia volatilization can also be expressed as the amount that results in a preferred pH of the treatment composition and/or of a sample of the resulting waste product. Thus, in a preferred embodiment the resulting waste product comprises a sample that has a pH of about 8.0 or below (e.g., 8 or below), more preferably about 7.5 or below (e.g., 7.5 or below), and even more preferably about 7.0 or below (e.g., 7 or below). In a more preferred embodiment, the pH of the sample remains at or below the above recited pH values for at least about 4 hours (e.g., at least 4 hours), and more preferably for at least about 24 hours (e.g., at least 24 hours). In another embodiment the treatment composition has a pH of about 7.5 or below (e.g., 7.5 or below), more preferably 7.0 or below (e.g., 7 or below), and even more preferably about 6.5 or below (e.g., 6.5 or below). The pH of the treatment composition can be selected based upon the level of ammonia volatilization control.

In another embodiment, especially applicable when treating poultry litter with the treatment composition, the resultant waste product comprises from about 10 to about 90 wt. % moisture (e.g., 10 to 90 wt. %), and more preferably from about 5 to about 50% (e.g., 5 to 50 wt. %). The aluminum to phosphorus mole ratio (Al:P mole ratio) in the resultant waste product should be from about 0.01 to about 10.0 (e.g., 0.01 to 10), and more preferably from about 0.05 to about 5.0 (e.g., 0.05 to 5).

Another source of ammonia in animal rearing facilities is the dirt floor underneath the litter. Urine and/or spilled water can transport nitrogen containing compounds, such as ammonia, ammonium, urea or uric acid, downward into the soil under the litter or manure. To further reduce ammonia levels in rearing facilities, growers can apply dry or liquid manure amendments (treatment composition) to this floor after the litter and/or manure has been removed.

In another embodiment, the bedding material (e.g., wood shavings, sawdust, rice hulls, peanut hulls, recycled paper, recycled cardboard, and/or straw) may be treated with the treatment composition prior to or subsequent to its' placement in the animal rearing facility.

In accordance with an embodiment, other acids besides sulfuric acid may be combined with or separately applied together with alum mud, bauxite, and water to improve its' effectiveness or lower the cost. Inorganic or organic acids may be used for this purpose. Likewise, strong or weak acids may be used.

Take a large bulk litter sample from the house and mix in a suitable container, e.g., a plastic bucket. If interested in pH reduction, then add twenty grams of litter to ten centrifuge tubes. Then add 0, 0.1, 0.2, 0.4, 0.6, 0.8, 1.0, 1.5, 2.0 and 4.0 grams of the treatment composition to the litter. Afterwards, add 100 ml of D.I. water to each, shake for a suitable period of time, e.g., two hours, and measure the pH of solution.

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Example 1

Small (200-300 g) batches of 16 mixtures were made in the laboratory inside a fume hood using various amounts of alum mud, bauxite, sulfuric acid, liquid alum, and water (Table 1). The mixtures were made in small plastic tubs and mixed with a Teflon® spatula. The alum mud used had a moisture content of 30% and the bauxite moisture content was about 5%. When alum mud was mixed with bauxite and then sulfuric acid, the mixtures, which initially were liquid slurries after the acid was added, would heat up in a matter of seconds and begin to boil. In just 3-10 minutes the mixtures would usually harden into a hard, dry solid. Many of the mixtures, particularly with high bauxite or liquid alum contents, would surprisingly become too hard to break up by hand and a large mortar & pestle was necessary to break them up. A few of the samples were so hard that they could not be broken with a mortar & pestle and would require a sledge hammer to be broken up. The mixtures were allowed to air dry for 4 days, then they were ground and sieved through a 20 mesh sieve. Notes were made on the nature of the reaction, whether or not gas bubbles were given off, the amount of fumes given off, the hardness of the final product, and whether or not the final product was sticky or not (Table 2). Stickiness would be an unwanted characteristic for litter amendments; likewise, if the final product was as hard as stone, it would require extensive physical processing during production.

Titratable acidity of each of the 16 mixtures and samples of dry and liquid alum were made as follows: Two grams of each were weighed out into 40 ml centrifuge tubes and shaken one hr with 20 ml of DI water. The initial pH of this solution was recorded, then it was titrated with 1N NaOH to pH 8.3. The highest pH values were recorded with dry alum (3.02) and liquid alum (2.94). All other pHs ranged from 0.81 to 1.45 (Table 2). Titratable acidity averaged 7.35 meq/g solids for the 16 mixtures (Table 2), which was surprisingly the same order of magnitude as that found for dry alum (8.4 meq/g solid) or liquid alum (9.2 meq/g solid).

It should be noted that several of these mixtures became as hard (or harder) than concrete in a very short period. Some appeared to be as hard as stone. This was considered an undesirable property for a litter amendment, so they were not chosen for the laboratory ammonia study. However, they may present new possibilities as construction materials, for example as a replacement for concrete (e.g., replacement for concrete particularly suited to environments that are too acidic for regular concrete).

Ammonia volatilization study: Fresh poultry litter was collected from a commercial broiler house in Madison County, AR, that had been used to raise four flocks of broilers to 50 days of age. The same laboratory system used by Moore et al. (1995, 1996) was used in this study. One hundred grams of fresh, sieved litter was weighed into each of 44 750-mL air-tight plastic containers. There were 11 treatments that were all surface applied to the litter then mixed in the top 1 cm. There were four replications per treatment in a randomized block design. The 11 treatments were as follows:
A. Control;
B. 4 g dry alum;
C. 8 g liquid alum, which is equivalent to 4 g dry alum (sprayed on with mister);
D. 4 g of mixture #1 (57.1% alum mud, 4.3% bauxite, 38.6% sulfuric acid);
E. 4 g of mixture #2 (52.1% alum mud, 8.5% bauxite, 39.4% sulfuric acid);
F. 4 g of mixture #3 (47.2% alum mud, 12.5% bauxite, 40.3% sulfuric acid);
G. 4 g of mixture #5 (52.1% alum mud, 4.2% bauxite, 35.2% sulfuric acid, 8.5% liquid alum);
H. 4 g of mixture #6 (52.4% bauxite, 47.6% sulfuric acid);
I. 4 g of mixture #10 (48.6% alum mud, 26.4% sulfuric acid, 25% liquid alum);
J. 4 g of mixture #12 (39.2% alum mud, 8.1% bauxite, 27% sulfuric acid, 25.7% liquid alum);
K. 8 g of mixture #13 (9.1% sulfuric acid, 90.9% liquid alum, sprayed on with mister).

Ammonia-free air was passed through the containers. Ammonia from each sample was trapped in dual 30 ml boric acid traps, which were titrated daily with 0.1 M HCl for 14 days. At this time litter samples were taken for pH, soluble metals and P, and KCl-extractable $NH_4$. The litter in the containers was thoroughly mixed and 20 grams of litter was weighed into 250 ml centrifuge tubes. Two hundred ml of DI water was added to each, then the samples were shaken for one hour, centrifuged at 6,000 rpm for 15 minutes, then filtered through 0.45 um filter paper. The filtrate was then acidified and soluble P and metals were measured using an Inductively Coupled Argon Plasma Emission Spectrophotometer (ICP). Unfiltered samples were used for pH and EC measurements. A separate 20 g litter sample was extracted with 200 ml of 1 M KCl for one hour for exchangeable ammonium. The samples were acidified to pH 2 after filtration through 0.45 μm filter paper. Ammonium was determined using the salicylate-nitroprusside technique with an auto-analyzer (Technicon Instrumental Systems, Tarrytown, N.Y.) using EPA method 351.2 (U.S. Environmental Protection Agency, 1979, Methods for chemical analysis of water and wastes, (USEPA Rep. 600/4-79-020) USEPA, EMSL, Cincinnati, Ohio)).

Statistical Analysis: Statistical analyses of the data were performed as a randomized complete block design using the PROC GLM of SAS (SAS Institute, 1990, SAS/STAT user's guide, Version 6, 4th ed., SAS Institute Inc., Cary, N.C.). Least significant differences (LSD) among treatment means were determined using Duncan's new multiple-range test (Duncan, D. B., Biometrics., 11:1-42 (1955)) at the $P<0.05$ level.

Results and discussion. Rates of Litter Amendments used in this Study: Before discussing the results of the $NH_3$ volatilization study it should be pointed out that the rates of alum and other amendments used in this study (4 g/100 g litter or 4% by weight) were much lower than that used in most of the prior research conducted on alum, where the rate used was typically 10% alum on a weight basis (Moore et al., 1995, 1996, 1998, 1999, 2000). The lower rate (4%) was used because this is the "average" rate of alum poultry growers currently use in the U.S. The 10% rate of alum used in all of my prior research was based on the amount of aluminum needed to achieve a 1:1 Al/P mole ratio in poultry litter. Higher rates of alum or other amendments, such as 10%, would result in much lower litter pH, better $NH_3$ control for longer periods, and much lower water extractable P levels than that reported in this study.

Litter pH and Ammonia Volatilization: Litter pH was lowered ($P<0.05$) by all the litter amendments tested compared to the controls during the 14 day study (Table 3). Surprisingly, the pH of the untreated litter at the end of the study was 8.89, which was significantly higher than litter treated with dry alum (7.97) or liquid alum (8.12) or the other treatments, which ranged from 8.05 to 8.26 (Table 3), and the pH of most of the other amendments was not different from liquid or dry alum, except mixture 3, which was slightly higher than dry alum.

Figure 2:
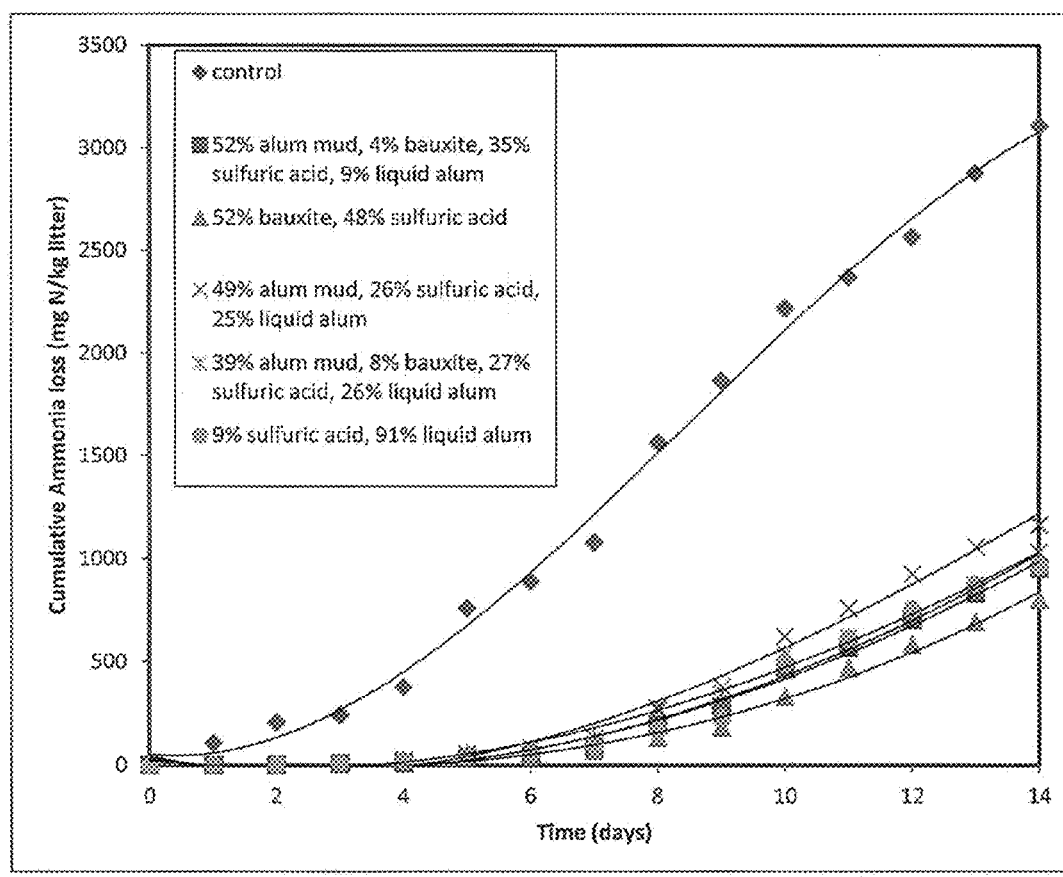
FIG. 2 shows cumulative $NH_3$ volatilization from untreated poultry litter and litter treated with mixtures 5, 6, 10, 12 and 13 as described below.

Cumulative $NH_3$ losses for untreated litter were 3,109 mg N/kg during the 14 day study, which were significantly higher than losses from litter receiving amendments (FIGS. 1 and 2, Table 3). Dry alum resulted in the lowest $NH_3$ volatilization (440 mg N/kg), however, it was surprisingly not significantly different from liquid alum (782 mg N/kg), mixture 1 (855 mg N/kg), mixture 3 (850 mg N/kg), or mixture 6 (802 mg N/kg). Proton donors, such as alum, reduce $NH_3$ volatilization by decreasing the litter pH and converting ammonia ($NH_3$), which is volatile, to ammonium ($NH_4^+$), which is not volatile, as follows:

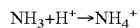

$$NH_3 + H^+ \rightarrow NH_4^+ \qquad \text{Equation 1}$$

Potassium chloride extractable $NH_4^+$, which consists of water soluble and exchangeable $NH_4^+$, surprisingly was significantly lower in untreated litter (3,300 mg N/kg), than with all the litter amendments (Table 3). Mixture 2 resulted in significantly higher KCl-extractable $NH_4^+$ than liquid alum (6,080 versus 5,620 mg N/kg) and mixtures 1 and 2 resulted in significantly higher values than mixtures 10 and 12. Since there was no detectable nitrate in these samples, all of the inorganic N present would be in the KCl-extractable $NH_4^+$ fraction. Typically inorganic N in litter is higher when $NH_3$ volatilization is reduced, hence it is another good indicator of how well a manure amendment works.

Water Extractable Phosphorus (WEP) in Poultry Litter: Water extractable P concentrations in the untreated litter (1,234 mg P/kg) surprisingly were significantly higher than litter treated with dry alum (920 mg P/kg), wet alum (656 mg P/kg), or the eight mixtures (707 to 934 mg P/kg). It was interesting to note that the liquid amendments (liquid alum and mixture 13) resulted in the lowest WEP values (Table 3). Mixture 3, 12 and 13 resulted in significantly lower WEP than dry alum. Earlier work has shown that reducing WEP in manure with amendments such as alum or aluminum chloride resulted in a concomitant reduction in P runoff (Shreve et al., 1995; Moore et al., 1999, 2000; Smith et al., 2001). Moore and Edwards (2007) showed that P runoff from pastures fertilized with alum-treated poultry litter was reduced by 75% compared to untreated litter when alum was applied at a rate of 10% by weight to poultry litter. Moore et al. (1998, 1999) explained that one of the reasons alum was chosen for P control in poultry litter was because aluminum phosphates were more stable over a very wide range of soil pH and redox conditions compared to calcium phosphate or iron phosphate minerals.

Water Extractable Zinc in Poultry Litter: Water extractable Zn in the untreated litter (55.0 mg Zn/kg) surprisingly was significantly higher than litter treated with any of the amendments (34.0 to 40.5 mg Zn/kg). As with WEP, water extractable Zn was lower in litter treated with the liquid amendments. Moore et al. (1998) found that alum additions to poultry litter resulted in significant reductions in soluble metals in poultry litter, such as As, Cu, and Zn, which resulted in less metal runoff from plots fertilized with litter.

Discussion: The data shown in FIGS. 1 and 2 and Table 3 demonstrated that many of the amendments tested surprisingly resulted in significantly lower litter pH and $NH_3$ volatilization, higher inorganic N, and lower soluble P and Zn than untreated litter. In most cases these new amendments surprisingly performed as well as dry or liquid alum. However, the price of these amendments will be less than half of that for refined dry or liquid alum for several reasons. The main cost associated with alum production is the cost of bauxite, which comprises over 50% of the raw material needed to make alum, with sulfuric acid comprising the remainder. Another cost associated with alum production is the disposal of alum mud, which has been considered a waste product in the past since there was no known use for it. Current landfill costs are approximately $30/ton, which does not include transportation costs. Finally, energy is required to make dry alum because it is made by using heat to dry and desiccate liquid alum. Amendments such as mixtures 1, 2, and 3 would only require 5-10% bauxite, rather than 50-55% or more as is the case with alum, thus resulting in tremendous savings. These amendments would also utilize alum mud which would otherwise be sent to a landfill at a cost of $30/ton (wet basis). They would also require less sulfuric acid (less than 40% on a weight basis) because the alum mud has already been reacted with sulfuric acid and is already acidic. There would also be no energy requirement since the addition of sulfuric acid to alum mud is a very dissicating reaction, resulting in a dry product that could easily be bagged or transported in bulk. Hence, some of these amendments, such as mixture 1 (57% alum, 4% bauxite and 39% sulfuric acid) would most likely cost at least 50% less than dry alum. This is a very conservative estimate and it may be as much as 60% cheaper to produce, depending on the relative cost of sulfuric acid and bauxite.

There will always be a need for highly refined aluminum products, such dry alum, liquid alum, and aluminum chloride. The most common uses for alum are for water purification and for making paper. Both of these uses require a product that totally dissolves (i.e., must be 100% water soluble). However, that is the not the case for manure amendments. The undissolved residual from alum mud or bauxite would not be noticeable when added to poultry litter or other animal manures and would not cause any environmental or production problems. Hence, these inexpensive mixtures would be very well suited as manure amendments.

Conclusions: During the past two decades, research has shown that aluminum sulfate, also referred to as alum ($Al_2(SO_4)_3 \cdot 14H_2O$), and aluminum chloride ($AlCl_3$), additions to animal manures are very effective in reducing ammonia ($NH_3$) emissions and phosphorus (P) runoff Improvements in poultry production, lower energy costs and environmental benefits from alum have led to widespread use by the poultry industry. Currently over one billion broilers are grown in the U.S. each year with alum. However, the price of alum has increased dramatically, creating a need for cheaper products that control $NH_3$ losses and P runoff. One of the goals of this research was to develop new inexpensive manure amendments that are as effective as alum in reducing $NH_3$ volatilization and soluble P in poultry litter. Sixteen mixtures (amendments) were created using various ratios of alum mud, bauxite ore, sulfuric acid, liquid alum and water. Alum mud is the residual that is left over from the manufacture of alum when made by mixing sulfuric acid with bauxite. After evaluating the physical and chemical characteristics of the 16 mixtures, 8 were tested in a laboratory $NH_3$ volatilization study which compared 11 treatments. Other treatments tested were untreated poultry litter (control), and litter treated with dry or liquid alum. Ammonia losses from untreated poultry litter during the 14 day study were 3,109 mg N/kg litter. All of the amendments tested surprisingly had significantly lower $NH_3$ losses ($P<0.05$) than the controls. Ammonia losses with dry and liquid alum were reduced by 86% and 75%, respectively. Surprisingly ammonia losses with the eight new amendments ranged from 62 to 73% less than controls and were not significantly different from liquid alum. The three most effective new mixtures were surprisingly not significantly different from dry alum with respect to $NH_3$ loss. Water extractable P (WEP) was 1,234 mg P/kg litter in the controls at the end of the study. Surprisingly, all of the amendments significantly reduced WEP ($P<0.05$); three of which resulted in significantly lower WEP than with dry alum. The most promising mixture was 57% alum mud, 4% bauxite, and 39% sulfuric acid. Several of the manure amendments, including this one, could be produced at less than half the price of alum, yet surprisingly they are equally effective at providing reductions in $NH_3$ loss and P runoff. The results of this study clearly demonstrated that inexpensive litter amendments that work as well as alum can be made using various combinations of alum mud, bauxite, and acid (e.g., sulfuric).

Example 2

Fresh poultry litter was collected from a barn in NW Arkansas that had been used to raise five flocks of broilers. The fresh litter was sieved through a 20 mesh sieve and 20 grams of litter were weighed out into 28 250-ml centrifuge tubes. There were seven treatments and four replications per treatment in a randomized block design. The treatments were added to litter, mixed well, and then the samples were allowed to incubate for approximately one hour. Afterwards, 200 ml of deionized water was added and the tubes were shaken for 2 hours. They were centrifuged at 7,000 rpm for 20 minutes and the supernatant pH was measured with a standard pH electrode. The treatments were as follows: (1) control (litter alone), (2) litter with 5% alum mud, (3) litter with 10% alum mud, (4) litter with 20% alum mud, (5) litter with 10% of mixture #1 (200 g alum mud+15 g bauxite+135 g sulfuric acid), (6) litter with 10% alum, and (7) litter with 10% mixture #4 (215 g alum mud+130 g sulfuric acid).

The results of this experiment are shown in Table 4. The pH of the untreated litter was 8.09. All of the amendments surprisingly resulted in a significant reduction in litter pH. When alum mud was applied at rates of 5, 10 and 20% by weight the pH was surprisingly reduced to 7.97, 7.93, and 7.76, respectively. When mixture #4 (alum mud+sulfuric acid) was applied at 10% by weight the pH was surprisingly much lower (5.91) than alum mud alone. Surprisingly, application of mixture #1 (alum mud+bauxite+sulfuric acid) resulted in an even lower pH (5.75) and 10% alum resulted in the lowest pH (5.65).

CONCLUSIONS

These data surprisingly indicated that although alum mud alone will lower the pH of poultry litter and thus reduce ammonia volatilization, the addition of acid (e.g., sulphuric) to alum mud resulted in a much lower pH than when alum mud alone was used.

All of the references cited herein, including U.S. Patents, are incorporated by reference in their entirety. Also incorporated by reference in their entirety are the following U.S. Pat. Nos. 5,622,697; 5,865,143; 5,890,454; 5,914,104; 5,928,403; 5,961,968; 6,346,240; 6,468,518; 7,011,824. Also incorporated by reference in its entirety is the following: Moore, P. A., Jr., and D. R. Edwards, J. Environ. Qual. 34: 2104-2111 (2005).

Thus, in view of the above, there is described (in part) the following:

A manure amendment composition, said composition comprising (or consisting essentially of or consisting of) a dry or liquid mixture of (1) alum mud and at least one member selected from the group consisting of acid, bauxite, and mixtures thereof, or (2) bauxite and at least one member selected from the group consisting of acid, alum mud, and mixtures thereof, which when added to animal manure will form a treated manure product having improved environmental, health and/or animal performance. The above manure amendment composition, wherein said acid is sulfuric acid. The above manure amendment composition, wherein said acid is hydrochloric acid. The above manure amendment composition, wherein said acid is phosphoric acid. The manure amendment composition, wherein said acid is nitric acid. The manure amendment composition according to claim 1, wherein said acid is perchloric acid. The above manure amendment composition, wherein said acid is selected from the group consisting of sulfuric acid, hydrochloric acid, phosphoric acid, nitric acid, perchloric acid, and mixtures thereof. The above manure amendment composition, wherein said composition does not contain alum. The above manure amendment composition, wherein said composition optionally contains alum. The above manure amendment composition, wherein said composition contains alum. The above manure amendment composition, wherein said composition does not contain water. The above manure amendment composition, wherein said composition optionally contains water. The above manure amendment composition, wherein said composition contains water. The above manure amendment composition, wherein said composition comprises alum mud and an acid. The above manure amendment composition, wherein said composition comprises alum mud and bauxite. The above manure amendment composition, wherein said composition comprises alum mud, an acid, and bauxite. The above manure amendment composition, wherein said composition comprises bauxite and an acid. The above manure amendment composition, wherein said composition comprises at least two members selected from the group consisting of alum mud, bauxite, and an acid. The above manure amendment composition according to claim 1, wherein said composition contains about 0.1 to about 99.9% by weight alum mud, 0 to about 99.9% by weight bauxite, and contains about 0.1 to about 99.9% by weight acid, wherein said percentages add up to 100%. The above manure amendment composition, wherein said composition contains 0 to about 99.9% by weight alum mud, about 0.1 to about 99.9% by weight bauxite, and contains about 0.1 to about 99.9% by weight acid, wherein said percentages add up to 100%. The above manure amendment composition, wherein said composition contains about 0.1 to about 99.9% by weight alum mud, about 0.1 to about 99.9% by weight bauxite, and contains about 0.1 to about 99.9% by weight acid, wherein said percentages add up to 100%. The above manure amendment composition, wherein said composition contains about 10 to about 90% by weight alum mud, about 1 to about 50% by weight bauxite, and contains about 2 to about 70% by weight acid, wherein said percentages add up to 100%. The above manure amendment composition, wherein said composition contains about 45 to about 65% by weight alum mud, about 2 to about 10% by weight bauxite, and contains about 10 to about 50% by weight acid, wherein said percentages add up to 100%. The above manure amendment composition, wherein said composition contains about 55 to about 60% by weight alum mud, about 2 to about 8% by weight bauxite, and contains about 35 to about 40% by weight acid, wherein said percentages add up to 100%.

A method of treating animal manure, said method comprising (or consisting essentially of or consisting of) contacting said animal manure with an effective treatment amount of the above manure amendment composition or alum mud to form a treated waste product having an improved environmental, health and/or animal performance property. The above method, wherein said acid is selected from the group consisting of sulfuric acid, hydrochloric acid, phosphoric acid, nitric acid, perchloric acid, and mixtures thereof. The above method, wherein said acid is sulfuric acid. The above method, wherein said animal manure is solid animal manure, liquid animal manure, poultry litter, or mixtures thereof. The above method, wherein said treatment amount is effective to reduce phosphorus solubility in said animal manure. The above method, wherein said treatment amount is effective to reduce the pH of said manure. The above method, wherein said treatment amount is effective to reduce phosphorus runoff and/or phosphorus leaching from fields fertilized with said animal manure. The above method, wherein said treatment amount is effective to inhibit ammonia volatilization from said animal manure. The above method, wherein said treatment amount is effective to improve weight gains, feed conversion, and/or disease resistance of animals. The above method, wherein said treatment amount is effective to reduce ammonia emissions from said animal manure. The above method, wherein said treatment amount is effective to reduce pathogens in said animal manure. The above method, wherein said treatment amount is effective to increase the nitrogen content of said animal manure. The above method, wherein said treatment amount is effective to reduce atmospheric nitrogen loading, soil acidity caused by ammonia deposition originating from said animal manure, or particulate matter less than 10 microns associated with said animal manure. The above method, wherein said treatment amount is effective to reduce energy use in an animal rearing facility. The above method, wherein said animal manure is from chickens, turkeys, ducks, geese, swine, sheep, goats, cattle, dairy cows, horses, or rabbits. The above method, wherein said treated waste product comprises from about 0.001 to about 50 parts by weight of the manure amendment containing alum mud, bauxite, water, and an acid, and about 50 to about 99.999 parts by weight animal manure. The above method, wherein said acid is selected from the group consisting of sulfuric acid, hydrochloric acid, phosphoric acid, nitric acid, perchloric acid, and mixtures thereof. The above method, wherein said composition optionally contains alum.

A method for inhibiting ammonia volatilization from animal manure, said method comprising (or consisting essentially of or consisting of) applying the above manure amendment composition or alum mud to animal manure in an amount sufficient to reduce the pH of said animal manure and thereby reduce ammonia volatilization from animal manure for at least 24 hours compared to untreated animal manure. The above method, wherein said acid is selected from the group consisting of sulfuric acid, hydrochloric acid, phosphoric acid, nitric acid, perchloric acid, and mixtures thereof. The above method, wherein said acid is sulfuric acid. The above method, wherein said manure amendment is applied as a liquid or a solid. The above method, wherein said manure amendment is applied in an amount sufficient to reduce the pH of said animal manure to a value less than or equal to 8.0. The above method, wherein said manure amendment is applied in an amount from about 0.001% to about 50% by weight of said animal manure. The above method, wherein said animal manure is from chickens, turkeys, ducks, swine, sheep, goats, cattle, cattle, dairy cows, horses, or rabbits. The above method, wherein said acid is selected from the group consisting of sulfuric acid, hydrochloric acid, phosphoric acid, nitric acid, perchloric acid, and mixtures thereof. The above method, wherein said composition optionally contains alum. The above method, wherein said animal manure is solid animal manure, liquid animal manure, poultry litter, or mixtures thereof.

A method for controlling atmospheric ammonia levels in an animal rearing facility, said method comprising (or consisting essentially of or consisting of) applying the above manure amendment composition or alum mud to a portion of a manure receiving surface (e.g., floor such as a dirt floor) in said animal rearing facility in an amount sufficient to reduce the pH of said portion and thereby inhibit ammonia volatilization from said manure receiving surface for at least 24 hours to control atmospheric ammonia levels in said animal rearing facility at or below a selected level, said manure receiving surface comprising (or consisting essentially of or consisting of) previously deposited manure. The above method, wherein said acid is selected from the group consisting of sulfuric acid, hydrochloric acid, phosphoric acid, nitric acid, perchloric acid, and mixtures thereof. The above method, wherein said acid is sulfuric acid. The above method, wherein said manure amendment mixture is applied as a liquid or a solid. The above method, wherein said manure receiving surface comprises a dirt floor. The above method, wherein said manure receiving surface comprises bedding material (e.g., wood shavings, sawdust, rice hulls, nut hulls, straw, recycled wood products or recycled paper products). The above method, wherein said manure receiving surface comprises a mixture of previously deposited manure and bedding material. The above method, wherein said manure receiving surface comprises poultry litter which is a mixture of manure, bedding material, spilled food, and feathers. The above method, further comprising (or consisting essentially of or consisting of) admixing said applied manure amendment mixture into said portion to a depth of about 20 cm or less. The above method, wherein said animal rearing facility is a facility for raising chickens, turkeys, ducks, geese, goats, swine, sheep, cattle, dairy cows, horses or rabbits. The above method, wherein said acid is selected from the group consisting of sulfuric acid, hydrochloric acid, phosphoric acid, nitric acid, perchloric acid, and mixtures thereof. The above method, wherein said composition optionally contains alum. The above method, wherein said animal manure is solid animal manure, liquid animal manure, poultry litter, or mixtures thereof.

A method for reducing the amount of phosphorus runoff and/or phosphorus leaching from fields fertilized with animal manure, said method comprising (or consisting essentially of or consisting of) treating animal manure to be used as agriculture fertilizer by admixing said animal manure with the above manure amendment composition or alum mud at a rate sufficient to reduce the water extractable phosphorus in said animal manure and thereafter applying said poultry litter or animal manure to fields (e.g., soil) as an agricultural fertilizer. The above method, wherein said acid is selected from the group consisting of sulfuric acid, hydrochloric acid, phosphoric acid, nitric acid, perchloric acid, and mixtures thereof. The above method, wherein said acid is sulfuric acid. The above method, wherein said acid is selected from the group consisting of sulfuric acid, hydrochloric acid, phosphoric acid, nitric acid, perchloric acid, and mixtures thereof. The above method, wherein said animal manure is from chickens, turkeys, ducks, geese, goats, swine, sheep, cattle, dairy cows, horses or rabbits. The above method, wherein said manure amendment is applied at a rate of between 0.001% to 50% by weight of said animal manure. The above method, wherein said animal manure comprises poultry manure, bedding, spilled food and feathers. The above method, wherein said composition optionally contains alum. The above method, wherein said animal manure is solid animal manure, liquid animal manure, poultry litter, or mixtures thereof.

A method for reducing the amount of metals runoff and/or leaching from fields fertilized with animal manure, said method comprising (or consisting essentially of or consisting of) treating animal manure to be used as agriculture fertilizer by admixing said animal manure with the above manure amendment composition or alum mud at a rate sufficient to reduce the water extractable metal content in said animal manure; and thereafter applying said animal manure to fields (e.g., soil) as an agricultural fertilizer. The above method, wherein said acid is selected from the group consisting of sulfuric acid, hydrochloric acid, phosphoric acid, nitric acid, perchloric acid, and mixtures thereof. The above method, wherein said acid is sulfuric acid. The above method, wherein said metals are selected from the group consisting of arsenic, copper, iron, zinc, and mixtures thereof. The method, wherein said acid is selected from the group consisting of sulfuric acid, hydrochloric acid, phosphoric acid, nitric acid, perchloric acid, and mixtures thereof. The above method, wherein said animal manure is from chickens, turkeys, ducks, geese, goats, swine, sheep, cattle, dairy cows, horses or rabbits. The above method, wherein said manure amendment is applied at a rate of between 0.001% to 50% by weight of said animal manure. The above method, wherein said animal manure comprises poultry manure, bedding, spilled food and feathers. The above method, wherein said composition optionally contains alum. The above method, wherein said animal manure is solid animal manure, liquid animal manure, poultry litter, or mixtures thereof.

A "hard" composition (to be used in construction (e.g., replacement for concrete particularly suited to environments that are too acidic for concrete) comprising a mixture of at least 10% wt bauxite, an acid, optionally alum mud, optionally alum (in liquid or dry form], and optionally water. The above "hard" composition, further containing alum.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Amount of alum mud, bauxite, sulfuric acid, liquid alum, and water in 16 mixtures.

| Mixture | alum mud | bauxite | sulfuric acid | liquid alum | Water |
|---|---|---|---|---|---|
| 1 | 200 | 15 | 135 | 0 | 0 |
| 2 | 185 | 30 | 140 | 0 | 0 |
| 3 | 170 | 45 | 145 | 0 | 0 |
| 4 | 215 | 0 | 130 | 0 | 0 |
| 5 | 185 | 15 | 125 | 30 | 0 |
| 6 | 0 | 215 | 195 | 0 | 0 |
| 7 | 110 | 105 | 160 | 0 | 0 |
| 8 | 155 | 45 | 135 | 30 | 0 |
| 9 | 0 | 200 | 180 | 30 | 0 |
| 10 | 175 | 0 | 95 | 90 | 0 |
| 11 | 140 | 0 | 75 | 150 | 0 |
| 12 | 145 | 30 | 100 | 95 | 0 |
| 13 | 0 | 0 | 7.5 | 74.7 | 17.9 |
| 14 | 115 | 0 | 50 | 210 | 0 |
| 15 | 140 | 60 | 135 | 35 | 0 |
| 16 | 85 | 85 | 120 | 90 | 0 |

All values are in grams.

TABLE 2

Mixture pH, acidity and notes regarding reaction and physical properties of final product.

| Mixture | pH | Acidity (meq/g) | Notes regarding the reaction during mixing and physical properties of final product |
|---|---|---|---|
| 1* | 0.81 | 7.45 | Very exothermic reaction. At day 4 it was dry, friable and easily breakable. |
| 2* | 0.94 | 7.45 | Very exothermic reaction with gas bubbles and some steam. On day 4, dry hard and breakable. |
| 3* | 0.97 | 7.50 | Most exothermic reaction. Lots of gas bubbles, almost a foam consistency at the highest release rate. Some (acid?) fumes liberated. On day 4, dry and hard, not breakable by hand. |
| 4 | 0.79 | 7.20 | Exothermic, but no "fizz" of gas bubbles. Consistency is thicker than previous treatments. On day 4, slightly moist with some sticky particles when broken by hand. |
| 5* | 0.81 | 7.20 | Exothermic with lots of gas bubbles. Lots of fumes when liquid alum was added which was after sulfuric acid. Very liquid after mixing, however, residue on spatula dried rapidly. At day 4 breakable by hand. Particles are sticky like modeling clay. |
| 6* | 0.99 | 8.60 | Exothermic. Very fast reaction. Set into hard pebbles before complete mixing. Crushed & mixed for 10 minutes. At day 4 dry, very hard gravel sized particles. |
| 7 | 1.11 | 8.00 | Extremely exothermic! Lots of gas bubbles & vapor. So much that at one time the sample looked like whipped cream. On day 4 dry, hard like concrete. |
| 8 | 0.91 | 7.50 | Exothermic reaction with gas bubbles. Very liquid at end. On day 4, dry, very hard, but not as hard as #7. |
| 9 | 1.39 | 7.65 | Very exothermic. Must mix rapidly before it sets up hard. Large plume of fumes when liquid alum added. Very hard like concrete on day 4. |
| 10* | 0.87 | 6.45 | Exothermic reaction. Very liquid at end. On day 4, moist, breakable but will be hard |

TABLE 2-continued

Mixture pH, acidity and notes regarding reaction and physical properties of final product.

| Mixture | pH | Acidity (meq/g) | Notes regarding the reaction during mixing and physical properties of final product |
|---|---|---|---|
| | | | to sieve (sticky). |
| 11 | 0.88 | 6.85 | Some heat generated. Very liquid. Signs of firming up in less than 10 minutes. At day 4, moist, like clay. |
| 12* | 0.97 | 6.15 | Exothermic reaction. Very liquid. Very little gas produced. On day 4, sticky and breakable by hand. |
| 13* | 1.17 | 10.1 | No big reaction. This is a liquid sample. |
| 14 | 0.98 | 5.45 | Slightly exothermic. Alum mud seems to expand when mixed with sulfuric acid and liquid alum. Dried quickly on spatula. On day 4, wet like mud. |
| 15 | 1.17 | 7.50 | Very exothermic. Lots of bubbles as well. On day 4, dry, hard, difficult to break. |
| 16 | 1.45 | 6.60 | Exothermic reaction. Hardens very rapidly in less than 10 minutes. On day 4, dry, very hard, like rock. |

*Treatments used in $NH_3$ study.

TABLE 3

Litter pH, cumulative ammonia volatilization, KCl-extractable ammonium, and water extractable P and Zn with and without litter amendments.

| Treatment | Litter pH in water | Cumulative $NH_3$ Loss in 14 days (mg N/kg) | KCl Extractable $NH_4$ (mg N/kg) | Water Extractable P (mg P/kg) | Water Extractable Zn (mg Zn/kg) |
|---|---|---|---|---|---|
| Control | 8.89 a | 3109 a | 3300 e | 1234 a | 55.0 a |
| Dry Alum | 7.97 c | 440 c | 5660 abed | 920 b | 36.3 def |
| Liquid Alum | 8.12 be | 782 be | 5620 bed | 656 e | 34.5 of |
| Mixture 1 | 8.13 be | 855 be | 6050 ab | 862 be | 38.0 bed |
| Mixture 2 | 8.20 be | 1016 b | 6080 a | 907 be | 40.5 b |
| Mixture 3 | 8.24 b | 850 be | 5840 abc | 735 de | 37.3 cde |
| Mixture 5 | 8.19 be | 955 b | 5920 abc | 872 be | 38.8 bed |
| Mixture 6 | 8.16 be | 802 be | 5980 ab | 850 be | 38.6 bcd |
| Mixture 10 | 8.17 be | 1167 b | 5320 d | 934 b | 39.3 be |
| Mixture 12 | 8.26 be | 1032 b | 5490 cd | 816 cd | 38.8 bed |
| Mixture 13 | 8.05 be | 971 b | 5770 abc | 707 e | 34.0 f |
| LSD 0.05 | 0.25 | 442 | 445 | 99.9 | 2.85 |

TABLE 4

Litter pH with and without various litter amendments.

| Treatment | pH |
|---|---|
| Control | 8.09 A |
| 5% alum mud | 7.97 B |
| 10% alum mud | 7.93 B |
| 20% alum mud | 7.76 C |
| 10% mixture #1 | 5.75 E |
| 10% alum | 5.56 F |
| 10% mixture #4 | 5.91 D |

I claim:

1. A manure composition having an improved environmental, health and/or animal performance comprising animal manure and a dry or liquid mixture of alum mud and at least one member selected from the group consisting of acid, bauxite, and mixtures thereof.

2. The manure composition according to claim 1, wherein said acid is sulfuric acid.

3. The manure composition according to claim 1, wherein said acid is hydrochloric acid.

4. The manure composition according to claim 1, wherein said acid is phosphoric acid.

5. The manure composition according to claim 1, wherein said acid is nitric acid.

6. The manure composition according to claim 1, wherein said acid is perchloric acid.

7. The manure composition according to claim 1, wherein said acid is selected from the group consisting of sulfuric acid, hydrochloric acid, phosphoric acid, nitric acid, perchloric acid, and mixtures thereof.

8. The manure composition according to claim 1, wherein said composition does not contain alum.

9. The manure composition according to claim 1, wherein said composition optionally contains alum.

10. The manure composition according to claim 1, wherein said composition does not contain water.

11. The manure composition according to claim 1, wherein said composition optionally contains water.

12. The manure composition according to claim 1, wherein said composition contains water.

13. The manure composition according to claim 1, wherein said composition comprises alum mud and an acid.

14. The manure composition according to claim 1, wherein said composition comprises alum mud and bauxite.

15. The manure composition according to claim 1, wherein said composition comprises alum mud, an acid, and bauxite.

16. The manure composition according to claim 1, wherein said composition comprises bauxite and an acid.

17. The manure composition according to claim 1, wherein said composition contains about 0.1 to about 99.9% by weight alum mud, 0 to about 99.9% by weight bauxite, and contains about 0.1 to about 99.9% by weight acid, wherein said percentages add up to 100%.

18. The manure composition according to claim 1, wherein said composition contains 0 to about 99.9% by weight alum mud, about 0.1 to about 99.9% by weight bauxite, and contains about 0.1 to about 99.9% by weight acid, wherein said percentages add up to 100%.

19. The manure composition according to claim 1, wherein said composition contains about 0.1 to about 99.9% by weight alum mud, about 0.1 to about 99.9% by weight bauxite, and contains about 0.1 to about 99.9% by weight acid, wherein said percentages add up to 100%.

20. The manure composition according to claim 1, wherein said composition contains about 10 to about 90% by weight alum mud, about 1 to about 50% by weight bauxite, and contains about 2 to about 70% by weight acid, wherein said percentages add up to 100%.

21. The manure composition according to claim 1, wherein said composition contains about 45 to about 65% by weight alum mud, about 2 to about 10% by weight bauxite, and contains about 10 to about 50% by weight acid, wherein said percentages add up to 100%.

22. The manure composition according to claim 1, wherein said composition contains about 55 to about 60% by weight alum mud, about 2 to about 8% by weight bauxite, and contains about 35 to about 40% by weight acid, wherein said percentages add up to 100%.

23. A method of treating animal manure, comprising contacting said animal manure with an effective treatment amount of alum mud or a manure amendment composition comprising a dry or liquid mixture of (1) alum mud and at least one member selected from the group consisting of acid, bauxite, and mixtures thereof, or (2) bauxite and at least one member selected from the group consisting of acid, alum mud, and mixtures thereof to form a treated waste product having an improved environmental, health and/or animal performance property.

24. The method according to claim 23, wherein said animal manure is solid animal manure, liquid animal manure, poultry litter, or mixtures thereof.

25. The method according to claim 23, wherein said treatment amount is effective to reduce phosphorus solubility in said animal manure.

26. The method according to claim 23, wherein said treatment amount is effective to reduce the pH of said manure.

27. The method according to claim 23, wherein said treatment amount is effective to reduce phosphorus runoff and/or phosphorus leaching from fields fertilized with said animal manure.

28. The method according to claim 23, wherein said treatment amount is effective to inhibit ammonia volatilization from said animal manure.

29. The method according to claim 23, wherein said treatment amount is effective to improve weight gains, feed conversion, and/or disease resistance of animals.

30. The method according to claim 23, wherein said treatment amount is effective to reduce ammonia emissions from said animal manure.

31. The method according to claim 23, wherein said treatment amount is effective to reduce pathogens in said animal manure.

32. The method according to claim 23, wherein said treatment amount is effective to increase the nitrogen content of said animal manure.

33. The method according to claim 23, wherein said treatment amount is effective to reduce atmospheric nitrogen loading, soil acidity caused by ammonia deposition originating from said animal manure, or particulate matter less than 10 microns associated with said animal manure.

34. The method according to claim 23, wherein said treatment amount is effective to reduce energy use in an animal rearing facility.

35. The method according to claim 23, wherein said animal manure is from chickens, turkeys, ducks, geese, swine, sheep, goats, cattle, dairy cows, horses, or rabbits.

36. The method according to claim 23, wherein said treated waste product comprises from about 0.001 to about 50 parts by weight of the manure amendment containing alum mud, bauxite, water, and an acid, and about 50 to about 99.999 parts by weight animal manure.

37. A method for inhibiting ammonia volatilization from animal manure, said method comprising applying alum mud or a manure amendment composition comprising a dry or liquid mixture of (1) alum mud and at least one member selected from the group consisting of acid, bauxite, and mixtures thereof, or (2) bauxite and at least one member selected from the group consisting of acid, alum mud, and mixtures thereof to animal manure in an amount sufficient to reduce the pH of said animal manure and thereby reduce ammonia volatilization from said animal manure for at least 24 hours compared to untreated animal manure.

38. The method according to claim 37, wherein said manure amendment is applied as a liquid or a solid.

39. The method according to claim 37, wherein said manure amendment is applied in an amount sufficient to reduce the pH of said animal manure to a value less than or equal to 8.0.

40. The method according to claim 37, wherein said manure amendment is applied in an amount from about 0.001% to about 50% by weight of said animal manure.

41. The method according to claim 37, wherein said animal manure is from chickens, turkeys, ducks, swine, sheep, goats, cattle, cattle, dairy cows, horses, or rabbits.

42. The method according to claim 37, wherein said animal manure is solid animal manure, liquid animal manure, poultry litter, or mixtures thereof.

43. A method for controlling atmospheric ammonia levels in an animal rearing facility, said method comprising applying alum mud or a manure amendment composition comprising a dry or liquid mixture of (1) alum mud and at least one member selected from the group consisting of acid, bauxite, and mixtures thereof, or (2) bauxite and at least one member selected from the group consisting of acid, alum mud, and mixtures thereof to a portion of a manure receiving surface in said animal rearing facility in an amount sufficient to reduce the pH of said portion and thereby inhibit ammonia volatilization from said manure receiving surface for at least 24 hours to control atmospheric ammonia levels in said animal rearing facility at or below a selected level, said manure receiving surface comprising previously deposited manure.

44. The method according to claim 43, wherein said manure amendment mixture is applied as a liquid or a solid.

45. The method according to claim 43, wherein said manure receiving surface comprises a dirt floor.

46. The method according to claim 43, wherein said manure receiving surface comprises bedding material.

47. The method according to claim 43, wherein said manure receiving surface comprises a mixture of previously deposited manure and bedding material.

48. The method according to claim 43, wherein said manure receiving surface comprises poultry litter which is a mixture of manure, bedding material, spilled food, and feathers.

49. The method according to claim 43, further comprising admixing said applied manure mixture into said portion to a depth of about 20 cm or less.

50. The method according to claim 43, wherein said animal rearing facility is a facility for raising chickens, turkeys, ducks, geese, goats, swine, sheep, cattle, dairy cows, horses or rabbits.

51. The method according to claim 43, wherein said animal manure is solid animal manure, liquid animal manure, poultry litter, or mixtures thereof.

52. A method for reducing the amount of phosphorus runoff and/or phosphorus leaching from fields fertilized with animal manure, said method comprising treating animal manure to be used as agriculture fertilizer by admixing said animal manure with alum mud or a manure amendment composition comprising a dry or liquid mixture of (1) alum mud and at least one member selected from the group consisting of acid, bauxite, and mixtures thereof, or (2) bauxite and at least one member selected from the group consisting of acid, alum mud, and mixtures thereof at a rate sufficient to reduce the water extractable phosphorus in said animal manure and thereafter applying said animal manure to fields as an agricultural fertilizer.

53. The method according to claim 52, wherein said animal manure is from chickens, turkeys, ducks, geese, goats, swine, sheep, cattle, dairy cows, horses or rabbits.

54. The method according to claim 52, wherein said manure amendment is applied at a rate of between 0.001% to 50% by weight of said animal manure.

55. The method according to claim 52, wherein said animal manure comprises poultry manure, bedding, spilled food and feathers.

56. The method according to claim 52, wherein said animal manure is solid animal manure, liquid animal manure, poultry litter, or mixtures thereof.

57. A method for reducing the amount of metals runoff and/or leaching from fields fertilized with animal manure, said method comprising treating animal manure to be used as agriculture fertilizer by admixing said animal manure with alum mud or a manure amendment composition comprising a dry or liquid mixture of (1) alum mud and at least one member selected from the group consisting of acid, bauxite, and mixtures thereof, or (2) bauxite and at least one member selected from the group consisting of acid, alum mud, and mixtures thereof at a rate sufficient to reduce the water extractable metal content in said animal manure; and thereafter applying said animal manure to fields as an agricultural fertilizer.

58. The method according to claim 57, wherein said metals are selected from the group consisting of arsenic, copper, iron, zinc, and mixtures thereof.

59. The method according to claim 57, wherein said animal manure is from chickens, turkeys, ducks, geese, goats, swine, sheep, cattle, dairy cows, horses or rabbits.

60. The method according to claim 57, wherein said manure amendment is applied at a rate of between 0.001% to 50% by weight of said animal manure.

61. The method according to claim 57, wherein said animal manure comprises poultry manure, bedding, spilled food and feathers.

62. The method according to claim 57, wherein said animal manure is solid animal manure, liquid animal manure, poultry litter, or mixtures thereof.

63. A manure composition having an improved environmental, health and/or animal performance comprising animal manure and a dry or liquid mixture of bauxite and at least one member selected from the group consisting of acid, alum mud, and mixtures thereof.

* * * * *